US012595060B2

(12) United States Patent　　　　(10) Patent No.:　US 12,595,060 B2

Challenor　　　　　　　　　　　　　　(45) Date of Patent:　　　Apr. 7, 2026

(54) SEAT ASSEMBLY

(71) Applicant: Mirus Aircraft Seating Ltd., Hingham (GB)

(72) Inventor: Adam Challenor, Hingham (GB)

(73) Assignee: MIRUS AIRCRAFT SEATING LTD, Hingham (GB)

( * ) Notice: Subject to any disclaimer, the term of this patent is extended or adjusted under 35 U.S.C. 154(b) by 270 days.

(21) Appl. No.: 18/208,848

(22) Filed: Jun. 12, 2023

(65) Prior Publication Data

US 2023/0399108 A1　　Dec. 14, 2023

(30) Foreign Application Priority Data

Jun. 13, 2022　　(GB) ...................................... 2208638

(51) Int. Cl.
　　*B64D 11/06*　　　　(2006.01)
　　*B60N 2/427*　　　　(2006.01)
(52) U.S. Cl.
　　CPC .......... *B64D 11/06* (2013.01); *B60N 2/42709* (2013.01); *B60N 2/42745* (2013.01); *B64D 11/064* (2014.12); *B64D 11/0649* (2014.12)
(58) Field of Classification Search
　　CPC ............ B64D 11/0619; B60N 2/42709; B60N 2/4221; B60N 2/4228
　　See application file for complete search history.

(56) References Cited

U.S. PATENT DOCUMENTS 5,320,308 A * 6/1994 Bilezikjian ........ B64D 11/0619
297/216.1

| | | | | |
|---|---|---|---|---|
| 7,766,424 B2 * | 8/2010 | Haglund | .................. | B60N 2/22 |
| | | | | 297/216.12 |
| 2014/0070578 A1 * | 3/2014 | Szelagowski | ...... | B60N 2/42745 |
| | | | | 297/216.13 |
| 2019/0031352 A1 | 1/2019 | Pierson-Moonan et al. | | |
| 2020/0339264 A1 | 10/2020 | Baldomero | | |
| 2023/0391454 A1 * | 12/2023 | Dodman | ........... | B60N 2/42745 |

FOREIGN PATENT DOCUMENTS

| | | | | |
|---|---|---|---|---|
| EP | 2706010 A2 | 3/2014 | | |
| JP | 2005186670 A | * 7/2005 | .......... | B60N 2/4228 |
| KR | 101565577 B1 | 11/2015 | | |

(Continued)

OTHER PUBLICATIONS

International Search and Examination Report filed in the corresponding PCT Application dated Dec. 12, 2022; 6 pages.

(Continued)

*Primary Examiner* — Timothy J Brindley
(74) *Attorney, Agent, or Firm* — Black McCuskey

(57)　　　　　　　　ABSTRACT

A seat assembly comprising a support frame, a seat back assembly, an upper seat back fixing and a lower seat back fixing, the upper seat back fixing and the lower seat back fixing configured to connect the seat back assembly to the support frame, wherein: the upper seat back fixing comprises a rotatable connection between the seat back assembly and the support frame; and the lower seat back fixing comprises a friction assembly configured to hold the seat back assembly in position relative to the support frame in normal use and configured to allow the seat back assembly to move relative to the support frame in response to greater than a predetermined force being applied to the seat back assembly.

18 Claims, 13 Drawing Sheets

(56)     References Cited

FOREIGN PATENT DOCUMENTS

| WO | 2009011389 | A1 | | 1/2009 | | |
|----|------------|-----|---|--------|---|-------------|
| WO | WO-2018048363 | A1 | * | 3/2018 | | |
| WO | WO-2019020746 | A1 | * | 1/2019 | ........... | B60N 2/4221 |
| WO | WO-2021221652 | A1 | * | 11/2021 | ........... | B60N 2/4221 |

OTHER PUBLICATIONS

Extended European search report filed in the corresponding European application dated Oct. 31, 2023; 7 pages.

* cited by examiner

Fig. 7A
Fig. 7B
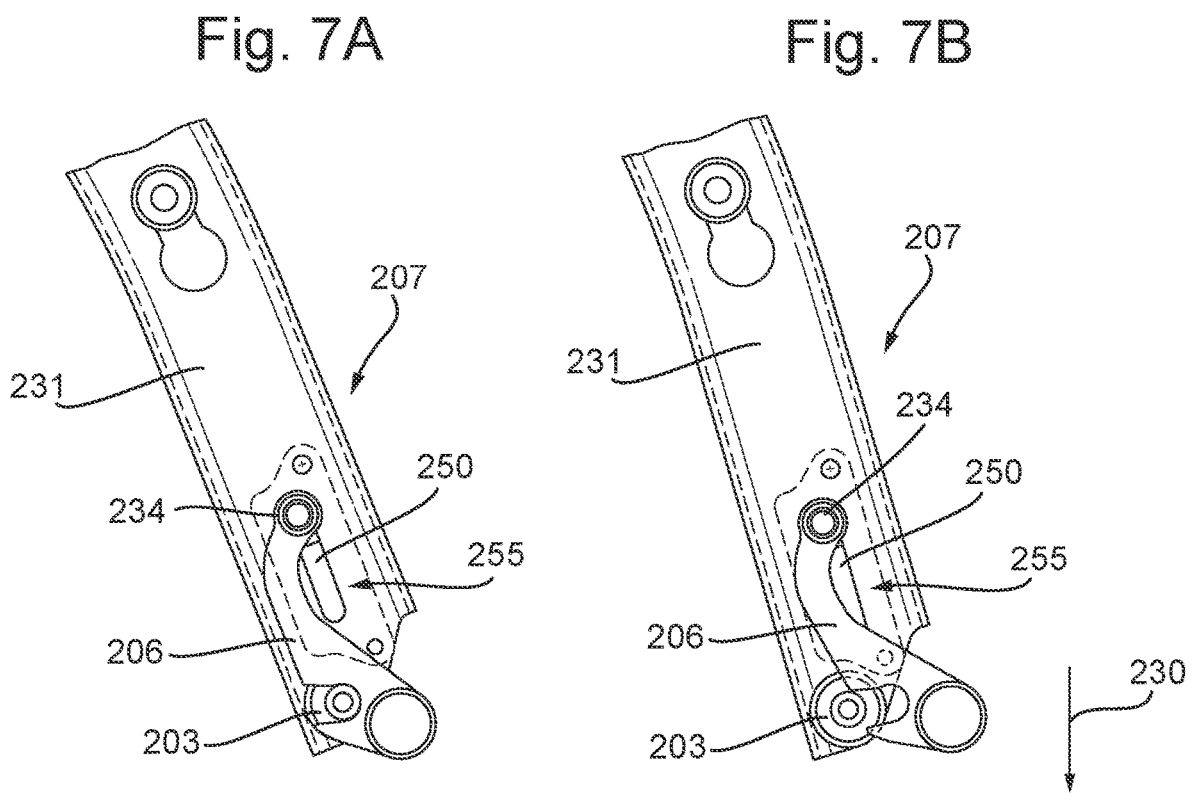
Fig. 7C
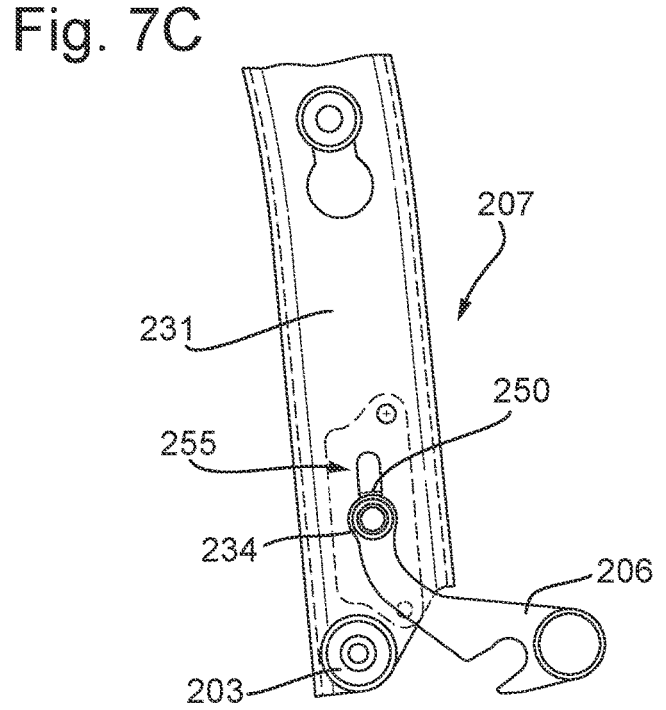

SEAT ASSEMBLY

TECHNICAL FIELD

The present disclosure relates to a seat assembly. In particular, the present invention relates to a seat assembly for a vehicle such as an aircraft.

BACKGROUND

Seat backs or seat back assemblies for providing support to a seat occupant are well known. The provision of suitable support in a seat structure, particularly for use in a vehicle, is important to limit the likelihood of harm or discomfort to a seat occupant.

Seating systems intended for use in aircraft preferably possess qualities or characteristics which are particularly appropriate for the aircraft environment. For example, they may be configured to absorb vibration or intermittent shock loads caused by turbulence. A seat back assembly intended for use as part of an aircraft seating system must pass rigorous safety tests to ensure that it is sufficiently strong to withstand not just heavy use, but also potentially extreme conditions such as may arise in the unlikely event of an aircraft impact. Furthermore, seat assemblies should be configured so that in the event of an impact, the effect on occupants of the aircraft seats is minimised.

Although numerous seat back designs are known, there is still a need to improve the previously proposed designs, in particular to provide a seat back assembly for a vehicle seat which is more robust and provides enhanced safety for a passenger.

STATEMENTS OF INVENTION

Embodiments of the present invention seek to provide an improved seat assembly for a vehicle seat, in particular for an aircraft seating system.

According to an aspect of the present disclosure, there is provided a seat assembly comprising a support frame, a seat back assembly, an upper seat back fixing and a lower seat back fixing, the upper seat back fixing and the lower seat back fixing configured to connect the seat back assembly to the support frame, wherein the upper seat back fixing comprises a rotatable connection between the seat back assembly and the support frame, and the lower seat back fixing comprises a friction assembly configured to hold the seat back assembly in position relative to the support frame in normal use and configured to allow the seat back assembly to move relative to the support frame responsive to a predetermined force being applied to the seat back assembly. For example, an upper portion of the seat back assembly (e.g. above the upper seat back fixing) may rotate or move with a component in a forwards direction responsive to the predetermined force being applied to the rear of the seat back assembly.

This configuration enables an upper portion of the seat back assembly to rotate forwards in the event that a predetermined force is applied to the seat back assembly. The predetermined force may be a force corresponding to a head impact (HIC) event. The movement of the seat back assembly in this manner reduces the deceleration of the head of an occupant in the seat behind the seat back assembly and facilitates head slide and reduces neck rotation during a HIC event.

The lower seat back fixing may comprise a link which limits movement of the seat back assembly relative to the support frame. The link may therefore be configured to restrict the relative motion of the seat back assembly and the support frame in order that the seat back assembly is not over tilted.

The link may be attached at one end to the seat back assembly and at the other end to the support frame, the friction assembly acting on the link to prevent it moving in normal use.

The friction assembly may apply an adjustable clamping force to the link and may be attached to the seat back assembly or the support frame.

The friction assembly may comprise Belleville washers. The Belleville washers may be mounted on a collar comprising a tubular portion which supports the washers and a flange which applies the clamping force to the link.

The link may be attached to the seat back assembly or the frame by means of a sliding connection which allows the link to translate as well as rotate. The link may be configured to translate substantially in a downward direction at the sliding connection and to rotate. This movement of the linkage increases a distance in a horizontal direction between the seat back assembly and the support frame below the upper seat back attachment, so that the seat back assembly above the upper seat back attachment is able to move in a forwards direction.

The sliding connection may comprise a slot in the seat back assembly and a linkage pin connected to the link, wherein the linkage pin is configured to be movable in the slot.

The link may be connected to the support frame by a rotatable connection which allows the link to rotate relative to the support frame.

The seat assembly may further comprise a restoring mechanism configured to oppose the movement of the seat back assembly relative to the support frame. The restoring mechanism may be mounted in the lower seat back fixing.

The restoring mechanism may comprise a resilient element such as an elastomeric element or a spring.

Advantageously, the restoring mechanism may provide an additional securing force preventing the seat back from being too easily pushed forward. The restoring mechanism may also assist in resetting the seat to its normal position.

The link may be aligned with a longitudinal axis of the support frame in normal use, so that the lower seat back fixing is kept as compact as possible and is concealed between the seat back assembly and the seat frame.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIGS. 7A to 7C illustrates a return mechanism for the seat back assembly using a resilient element in compression;

FIGS. 11A to 110 are side views of the second arrangement of seat release mechanism in various stages of engagement;

DETAILED DESCRIPTION

In the event of an impact of an aircraft, for example in a crash landing, the abrupt deceleration of the aircraft caused by the impact will cause the occupants to pitch forwards, often causing a collision of a head of an occupant with the seat directly in front of them. Such events are termed head impact events (HIC event). A collision of the head or upper body of a person with the seat directly in front of them may result in significant injury or trauma to the person. It is therefore desirable to design a seat assembly which reduces the likelihood or severity of injury to a person during a HIC event.

Figure 1:
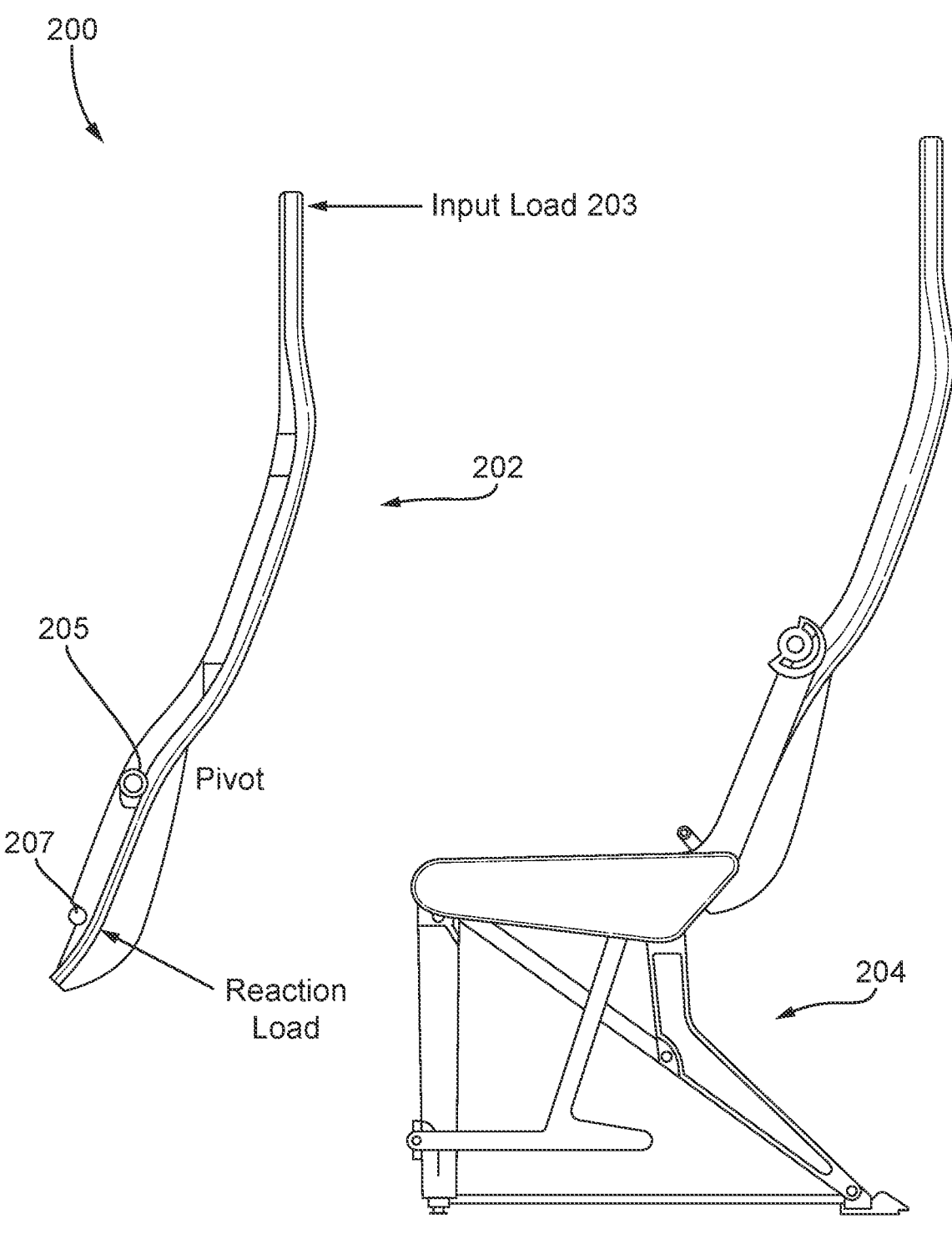
FIG. 1 shows a seat assembly according to an example.

FIG. 1 illustrates a seat assembly 200 according to an example. As is shown in this Figure, the seat assembly 200 comprises a support frame 204, a seat back assembly 202, an upper seat back fixing 205 and a lower seat back fixing 207. The upper seat back fixing and the lower seat back fixing are configured to connect the seat back assembly 202 to the support frame 204.

The upper seat back fixing 205 comprises a rotatable connection between the seat back assembly 202 and the support frame, and the lower seat back fixing comprises a friction assembly 203 configured to hold the seat back assembly 202 in position relative to the support frame 204 in normal use and to allow the seat back assembly 202 to move relative to the support frame 204 responsive to a force greater than a predetermined force being applied to the seat back assembly 202.

The seat back assembly 202 may comprise various components such as a seat cushion, a support frame, and so on. The support frame 204 may be formed of various components joined together or may be integrally formed. The support frame 204 is connectable to a floor of the aircraft cabin using conventional fixings.

In an example, the input load (e.g. the predetermined force) which causes the friction assembly 203 to allow the seat back assembly 202 to pivot may be in the region of 400N (e.g. 350N-700N). In such an example, the distance between the upper seat back fixing 205 at which the seat back assembly 202 is configured to pivot and the lower seat back fixing 207 is approximately 139 mm. The distance between the location at which the input load is applied and the upper seat back fixing 205 is approximately 600 mm. The load multiplier of such a configuration is approximately 4.31 times, so that the reaction (friction) load incident on the friction assembly 203 is approximately 1727N. The coefficient of friction of the friction assembly 203 at the release point is approximately 0.7 in this example. It will be appreciated that the coefficient of friction may vary depending on the materials used. The normal clamping force at the friction assembly 203 may be approximately 2500N.

It will be appreciated that the particular values used here are exemplary and different parameters may be used depending on requirements such as a load at which the friction assembly 203 should release the seat back assembly 202. The values may therefore further depend on material selection and installation geometry.

The input force which causes the seat back assembly 202 to rotate forwards as described above may be set lower than an abuse load. An abuse load is a load at which the force applied to the seat assembly is a result of mistreatment of the seat, rather than a HIC event. If the input force which causes the seat back assembly 202 to rotate forwards is set lower than an abuse load, a release mechanism of the friction assembly 203 can inadvertently be triggered during application of an abuse load. This may be problematic if the seat back assembly 202 is caused to rotate forward unnecessarily, for example, by a child kicking the seat. However, as is described later, the seat assemblies 200 described herein may be advantageously further configured to be reset after an abuse event.

Figure 2A:
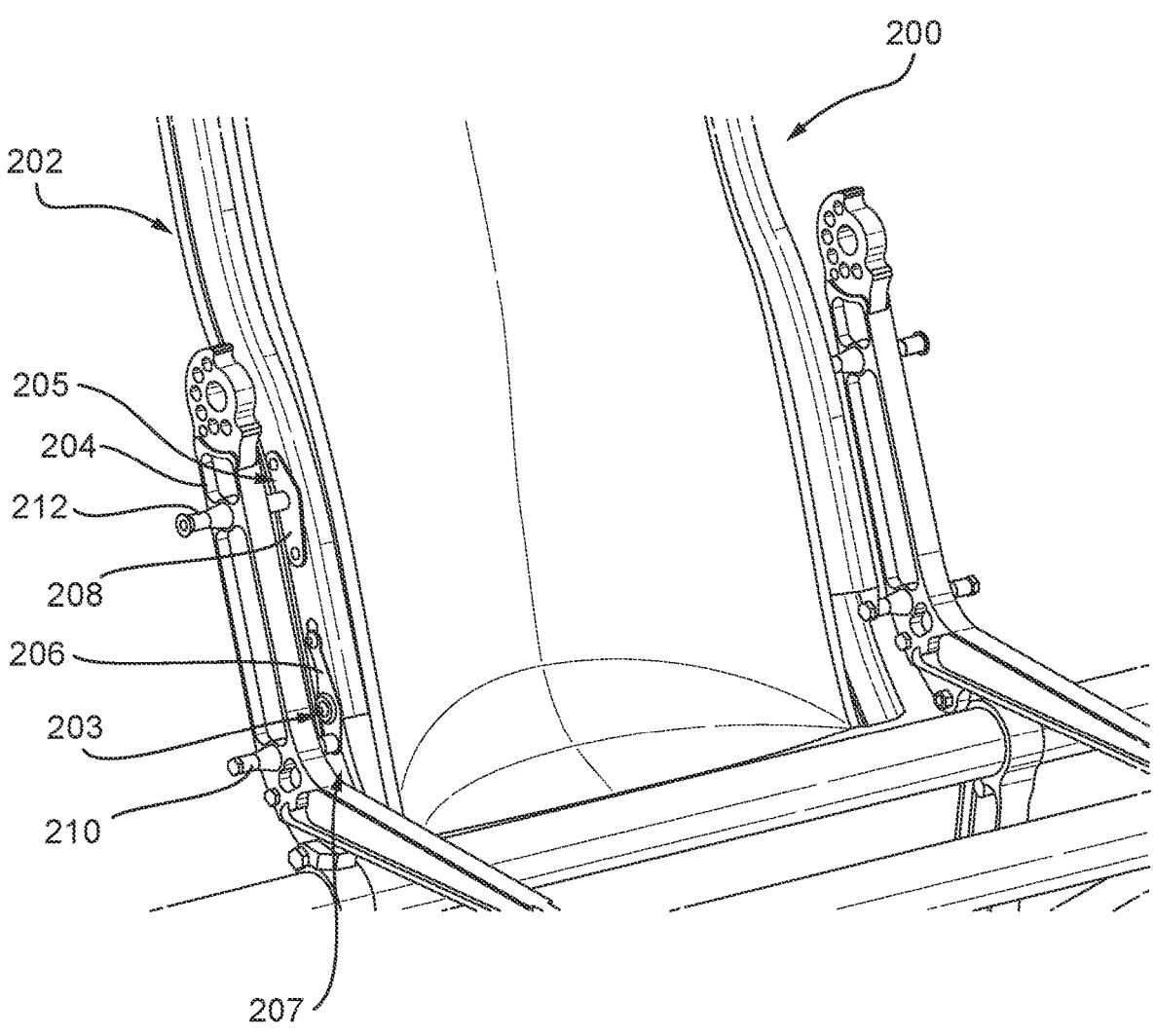
FIG. 2A is an enlarged perspective view of the seat assembly.

FIG. 2A shows a schematic illustration of a seat assembly 200 according to an example. In particular, the seat assembly 200 comprises a seat back assembly 202 and a support frame 204. The seat back assembly 202 further comprises an upper seat back fixing 205 and a lower seat back fixing 207 which are configured to connect the seat back assembly 202 to the support frame 204. The upper seat back fixing 205 provides a rotatable connection between the seat back assembly 202 and the support frame 204, and the lower seat back fixing 207 comprises a friction assembly 203 configured to hold the seat back assembly 202 in position relative to the support frame 204 in normal use and to allow the seat back assembly 202 to move relative to the support frame 204 responsive to a predetermined force being applied to the seat back assembly 202.

The lower seat back fixing 207 of this example comprises a link 206 rotatably mounted to the seat back assembly 202 and the support frame 204 and controlled by the friction assembly 203. The link 206 allows limited movement of the seat back assembly relative to the support frame. The support frame 204 is connected to the seat back assembly 202 via a first pin 210. The first pin 210 is rotatably connected to the link 206 by a bolt 218 which passes through a bore 211 provided in a first end of the link 206. The pin 210 connects the link 206 to the support frame 204. The support frame 204 is also connected to the seat back assembly 202 via a second pin 212 which connects the support frame 204 to the seat back assembly 202 at the upper seat back fixing 205. The upper seat back fixing 205 comprises a retention plate 208 configured to retain the second pin 212 in position. In this example, the second pin 212 is received in an opening/slot in the seat back assembly 202 and is retained in the opening by the retention plate 208.

Figure 2B:
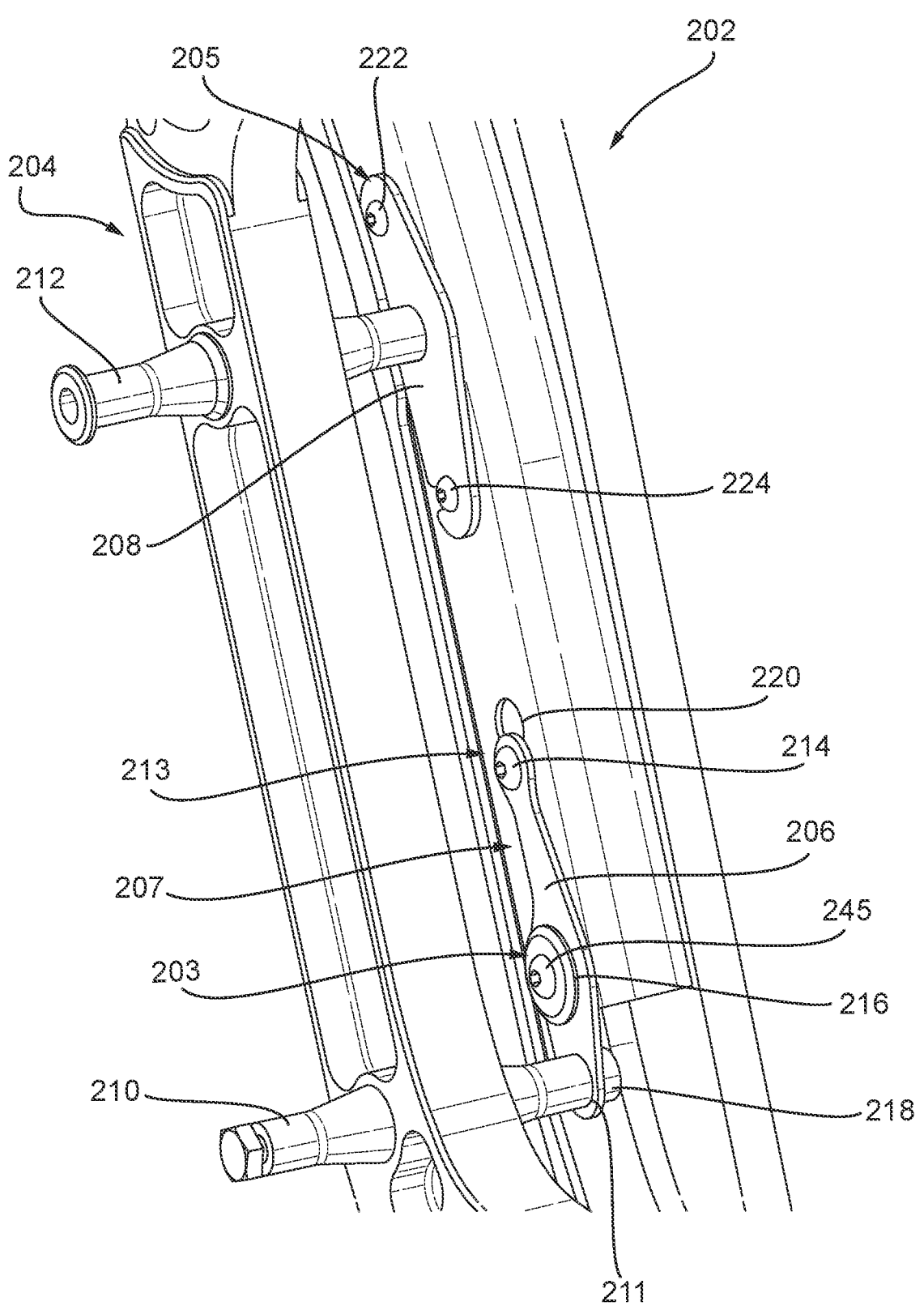
FIG. 2B shows seat back fixings of a seat assembly joining the seat back assembly to the support frame.

FIG. 2B provides a more detailed view of the connections between the seat back assembly 202 and the support frame 204 shown in FIG. 2A. The seat back assembly 202 is able to rotate relative to the support frame 204 at the upper seat back fixing 205. The retention plate 208 of the upper seat back fixing is fixed to the seat back assembly 202 by a pair of releasable fixings such as a bolts or screws 222, 224 which are fixed into the seat back assembly 202 through a fixing hole and fixing slot formed in opposite ends of the retention plate 208.

The lower seat back fixing 207 comprises a sliding connection 213 between an upper end of the link 206 and the seat back assembly 202. The link 206 is mounted to the seat back assembly 202 by the siding connection 213 and to the support frame by the friction assembly 203 and by a bolt 218 screwed into the first pin 210 through an opening in a lower end of the link 206.

The sliding connection 213 comprises a slot 220 formed in a wall 231 of the seat back assembly 202 and a linkage pin 214 which is fixed to the link 206 and is slideably received and captive in the slot 220.

As can be seen in this example, the upper seat back fixing 205 and the lower seat back fixing 207 are arranged substantially in line with the support frame 204 in normal use (e.g. substantially in line with the wall 231 of the seat back assembly 202). For example, the upper seat back fixing 205 and the lower seat back fixing 207 may be provided substantially along a centreline of the wall 231 of the seat back assembly 202. This provides a compact design for the seat assembly 200 while providing the benefits associated with the selectively releasable lower seat back fixing 207 described below.

In the illustrated embodiment, the friction assembly 203 comprises a clamping arrangement which clamps the link 206 in normal use and allows the link 206 to slide out of the friction assembly 203 when a force greater than a predetermined force is applied to the seat back assembly 202.

In particular, the predetermined force may be a force similar to that applied to a seat back assembly 202 in a head impact (HIC) event. In the event of a collision of the aircraft, the head of an occupant of a seat arranged in the aircraft directly behind the seat comprising the seat back assembly 202 described herein may impact with the seat back assembly 202. Due to the location of the head relative to the seat, the impact is likely to be in an upper half of the seat back assembly 202. The force with which the occupant's head may impact the seat in front of them may cause them significant injury. To alleviate this concern, the configurations described herein, in the event of a predetermined force being applied to the back of the seat back assembly 202, enable the friction assembly 203 to release the link 206, so that the seat back assembly 202 can rotate about the upper seat back fixings 205 and the upper portion of the seat back assembly 202 (e.g. above the upper seatback fixings 205) is able to tilt forwards increasing the time over which the impact is absorbed through the seat assembly 200 and thereby reducing the deceleration and likely severity of injury. As mentioned above, the link 206 is rotatably mounted at one end to the support frame 204 and at the other end to the seat back assembly 202, so even after it has been released from the friction assembly 203, it serves to limit the movement of the seat back assembly 202 relative to the support frame 204, so that the seat back assembly 202 is not over tilted and thereby is prevented from causing an injury to the passenger sitting on that seat.

The mechanisms described herein operate to reduce the deceleration of the head of an occupant in the seat behind the seat back assembly 202 and facilitate head slide and reduce neck rotation during a HIC event. In addition, the use of the link 206 protects the passenger in the seat in front from injury as the amount that the seat back assembly 202 can pivot forward is limited by the link 206. Thus, the examples described herein may serve to prevent or lessen or prevent injury to both the passenger in the seat and the passenger in the seat behind, in the event of a HIC event.

Figure 3A:
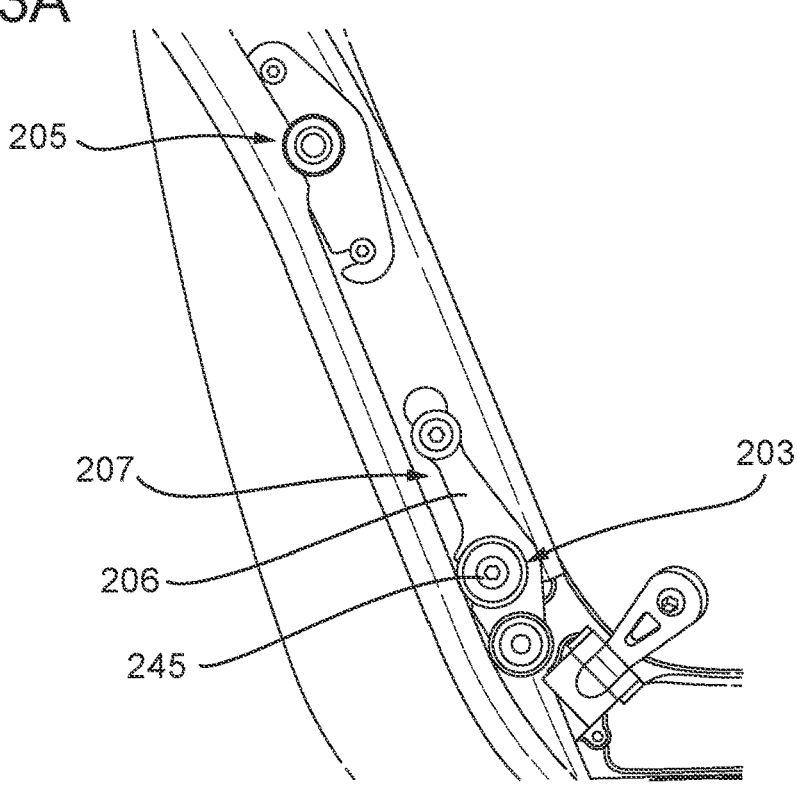
FIG. 3A is a side view of the seat assembly and seat back fixings in a first orientation.
Figure 3B:
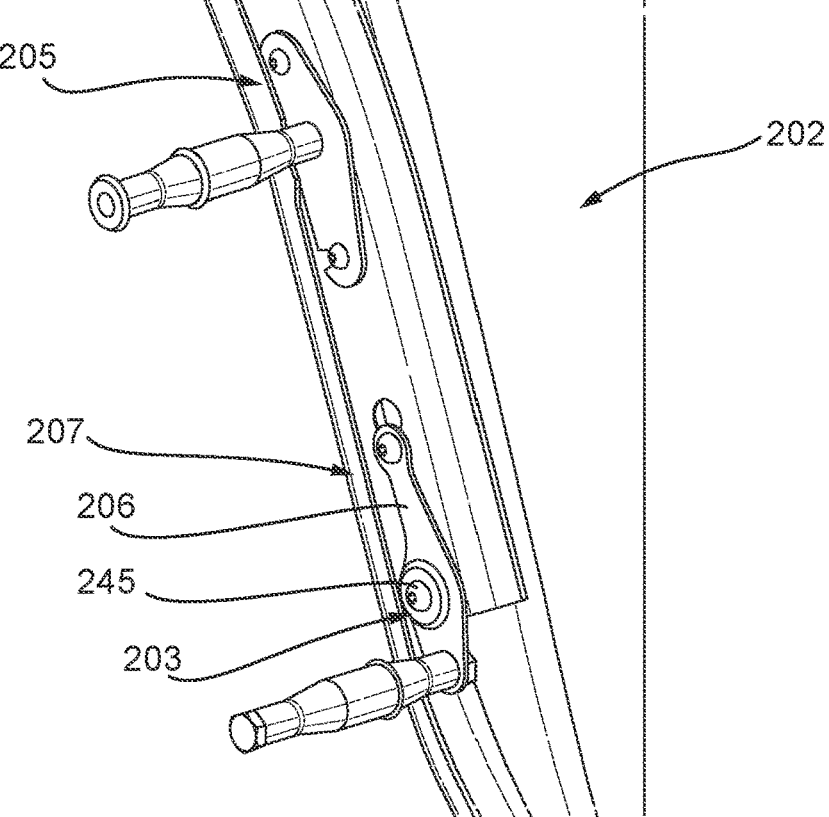
FIG. 3B is an enlarged perspective view of the seat back fixings in a first orientation.

FIGS. 3 to 5 illustrates an example of the relative movement of the different components of the seat assembly in the event of greater than a predetermined force being applied to the seat back assembly, for example a force approximating to the force encountered in a HIC incident. FIG. 3A is a side view and FIG. 3B is a perspective view of the upper seat back fixing 205 and the lower seat back fixing 207 in a normal use configuration in which the friction assembly 203 holds the link 206 such that it is substantially parallel to the seat back assembly 202 and the support frame 204.

Figure 4A:
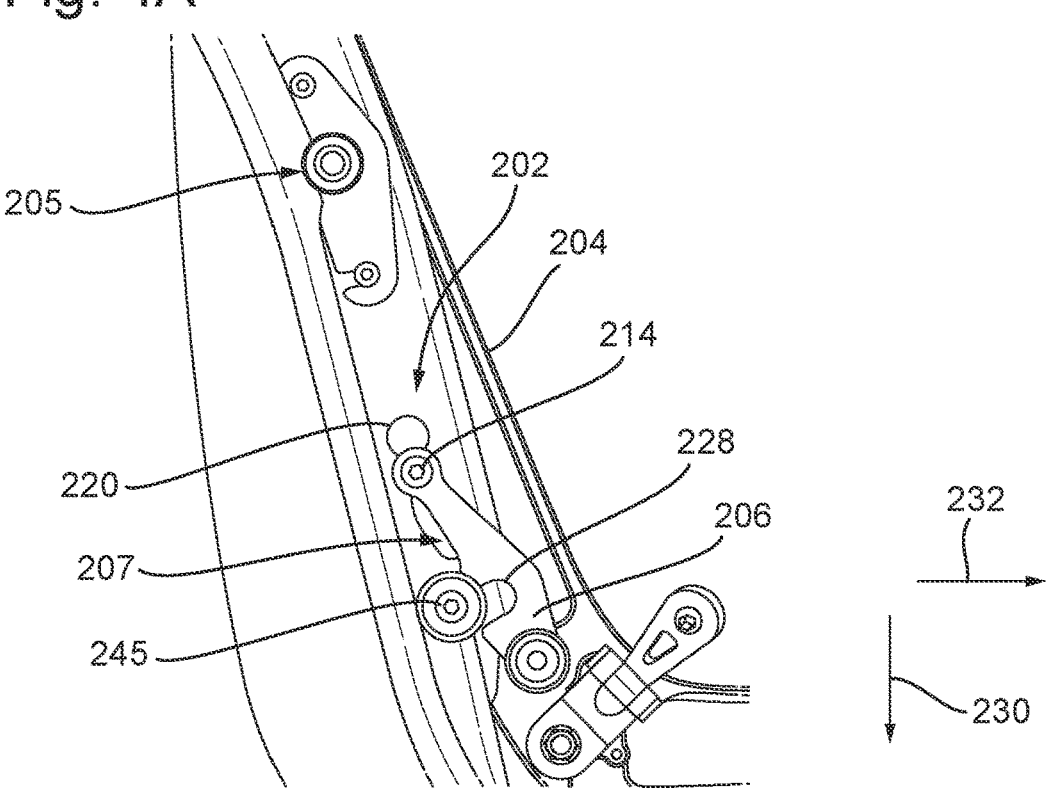
FIG. 4A is a side view of the seat assembly and seat back fixings in a second orientation.
Figure 4B:
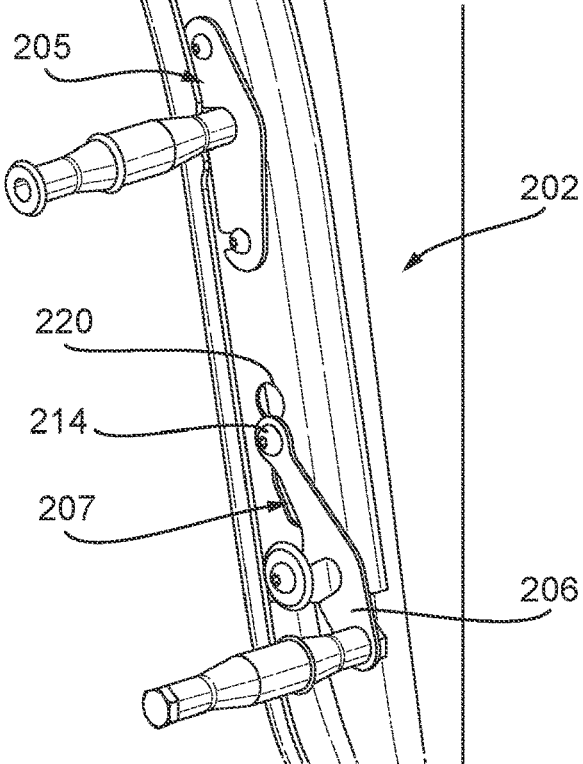
FIG. 4B is an enlarged perspective view of the seat back fixings in a second orientation

FIG. 4A is a side view and FIG. 4B is a perspective view of the upper seat back fixing 205 and the lower seat back fixing 207 in an overload configuration in which a force greater than a predetermined force (sufficient to cause the friction assembly to release the link 206) is applied to the seat back assembly—for example during a HIC event. In this configuration, the resistance of the friction assembly has been overcome and the link 206 has slipped forward out of the friction assembly. At the same time the linkage pin 214 has travelled down the slot 220 substantially in the direction 230 allowing a lower end of the seat back assembly to swing away from the support frame 204 and the upper end of the seat back assembly 202 to pivot forwards in the direction 232.

Figure 5A:
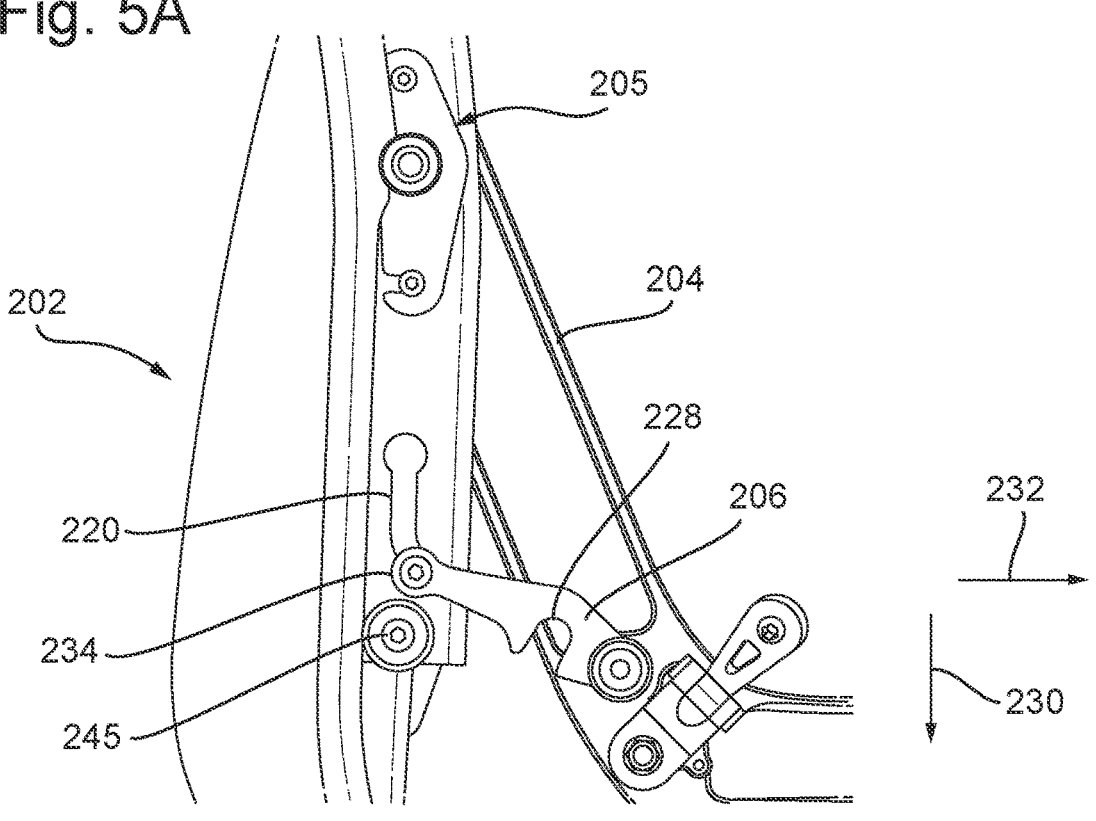
FIG. 5A is a side view of the seat assembly and seat back fixings in a third orientation.
Figure 5B:
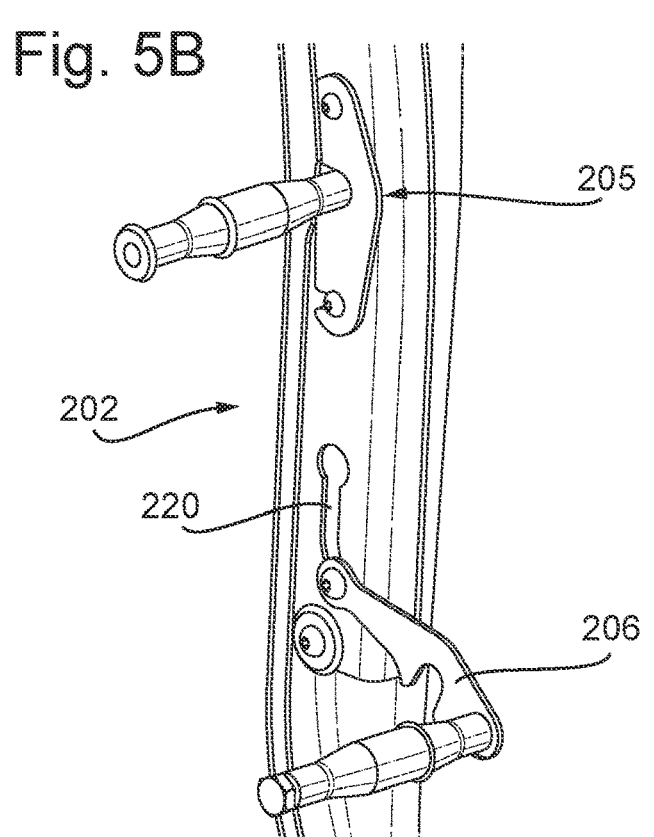
FIG. 5B is an enlarged perspective view of the seat back fixings in a third orientation

FIGS. 5A and 5B illustrate a configuration of the seat at the final stage of a HIC event in which the linkage pin has reached the end of its travel because it has bottomed out in the slot 220. The link 206 can therefore move no further and it acts to constrain the seat back assembly 202 from pivoting further about the upper seat back fixings 205.

Figure 6:
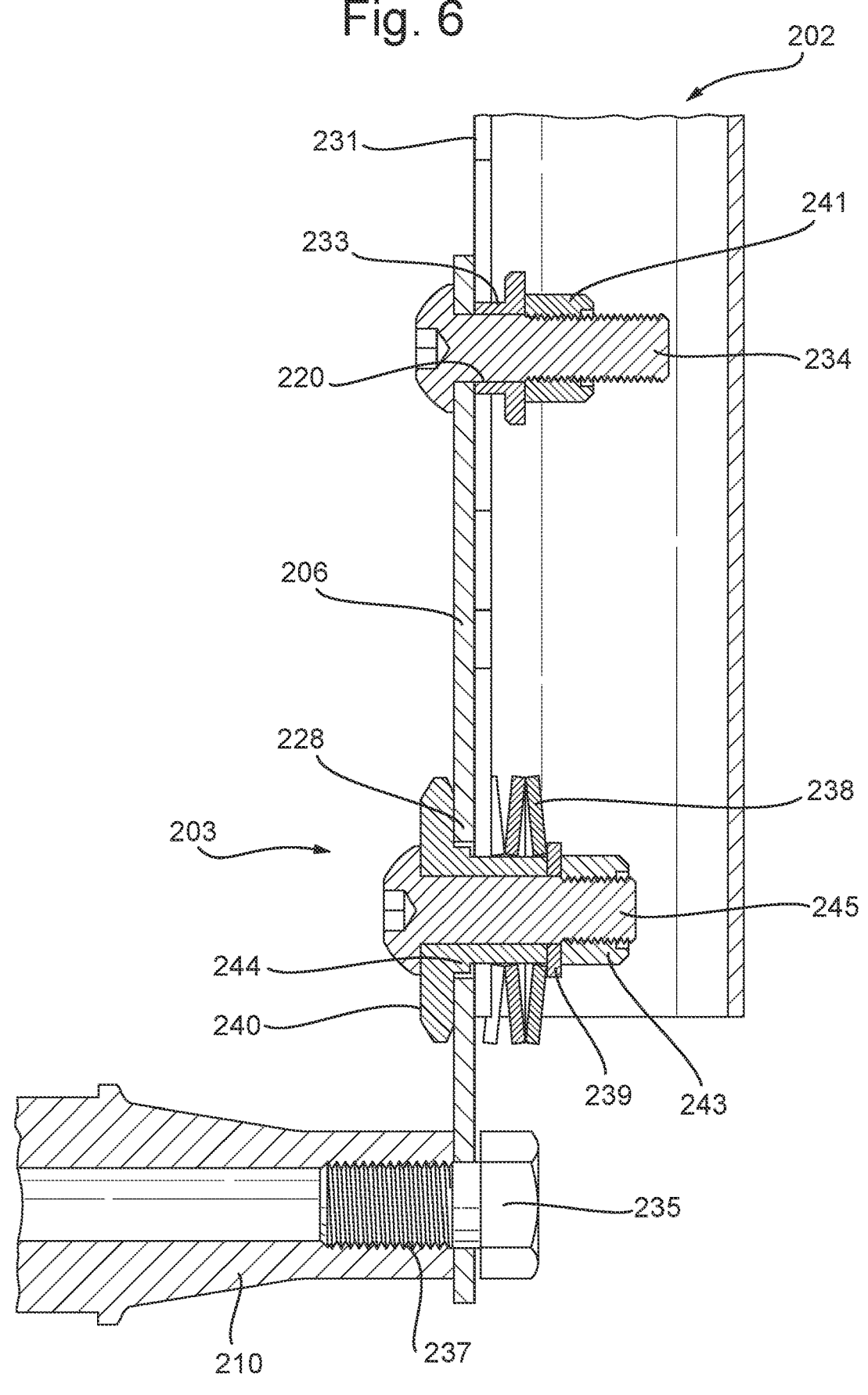
FIG. 6 is a cross section through the lower seat back fixing.

FIG. 6 is a cross section through the link 206 and the three distinct fixings which control its articulation. In the illustrated embodiment, the link 206 comprises a flat steel plate, but it may take other forms, for example, it may be tubular and may be formed from other materials such as aluminium or carbon fibre.

The upper fixing comprises the linkage pin 234 which passes through an opening in an upper end of the link 206 and through a collar 233 and nut 241. The slot 220 which is formed through the wall 231 of the seat back assembly 202 is keyhole shaped and comprises an enlarged portion and a narrower portion. The enlarged portion is large enough to allow the nut 241 and collar 233 to pass through. When the link 206 is pulled downwardly, the collar becomes captive in the narrower portion of the slot 220 so that the linkage pin 234 is prevented from being pulled from the slot. The linkage pin 234 is not a tight fit in the slot and so is free to rotate and to slide in the slot.

The lower fixing comprises a bolt 235 screwed through a hole in the link 206 into a threaded bore 237 formed in a lower end of the first pin 210. This arrangement creates a rotatable connection between the link 206 and the support frame 204.

The intermediate fixing comprises the friction assembly 203. The friction assembly 203 comprises a bolt 245 such as a machine screw screwed into a second nut 243. The bolt 245 passes through a friction collar 240 which supports a stack of Belleville washers 238 which are held in place by a plain washer 239 disposed between the stack of Bellville washers 238 and the nut 243. The collar 240 passes through the cut out 228 in the link 206 and through the wall 231 of the seat back assembly 202, so that when the nut 243 is tightened onto the bolt 245, thereby compressing the stack of Belleville washers 238, the link 206 is held firmly against the wall 231 of the seat back assembly 202 under the action of the compressed stack of Belleville washers 238.

The length of the collar 240 is carefully selected so that when the nut 243 is tightened onto the bolt 245 and the washer 239 bottoms out against the collar 240, the desired load is applied by the stack of Belleville washers 238 to achieve the desired frictional resistance between the collar 240 and the link 206. This then sets the load which must be applied to the seat back assembly 202 to cause the link 206 to be released from the friction assembly 203.

A shoulder 244 is formed on the collar 240. The shoulder 244 is slightly smaller than the thickness of the link 206, so that when the link 206 has been released from the friction assembly and the shoulder 244 contacts the wall 231 of the seat back assembly, a gap remains between the collar 240 and the wall 231 of the seat back assembly. This allows the link 206 to be more easily pushed back under the collar 240 when the seat back assembly 202 is reset back into its normal operating position after an unintended release of the link 206, which might occur in the case of a sufficiently high abuse load being applied to the seat back.

As noted above a cut out 228 is formed in the link 206. The cut out 228 is sized to fit closely around the shoulder 244 and to allow the link 206 to be clamped across substantially its full width by the friction collar 240 under the action of the stack of Belleville washers 238.

By adjusting the number and orientation of the Belleville washers, the clamping/friction force applied to the link 206 can be adjusted, thereby altering the predetermined force applied to the rear of the seat back assembly 202 which will cause the link to slide free of the friction assembly 203.

The seat assembly 200 may further comprise a restoring mechanism 255 configured to provide a force to at least partially restore the seat back to its normal operating position.

Figure 8A:
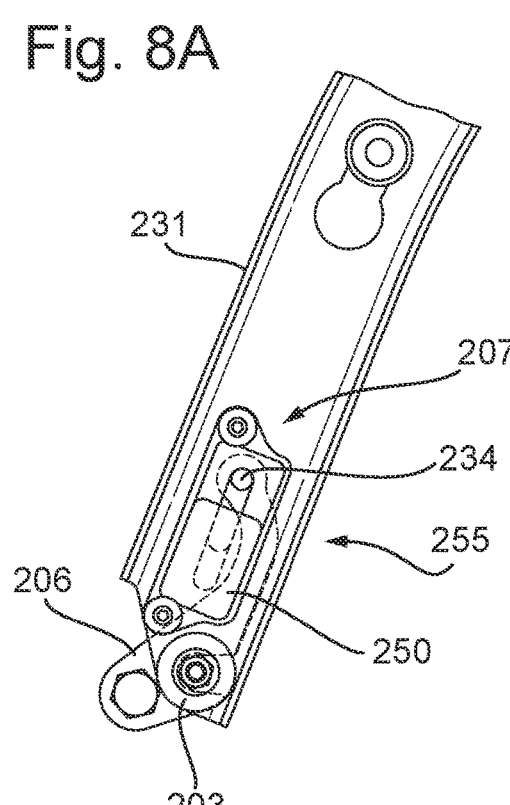
FIGS. 8A to 8C illustrates the return mechanism of FIGS. 7A to 7C viewed from the inside of the seat back assembly.
Figure 8B:
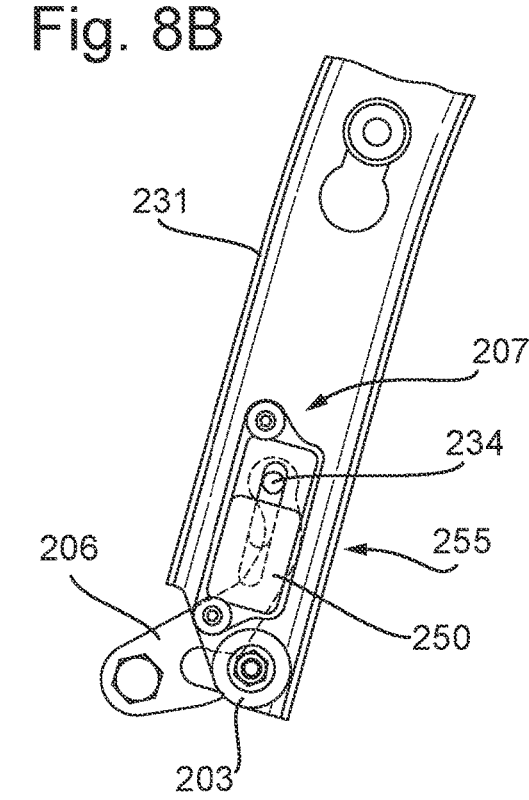
Figure 8C:
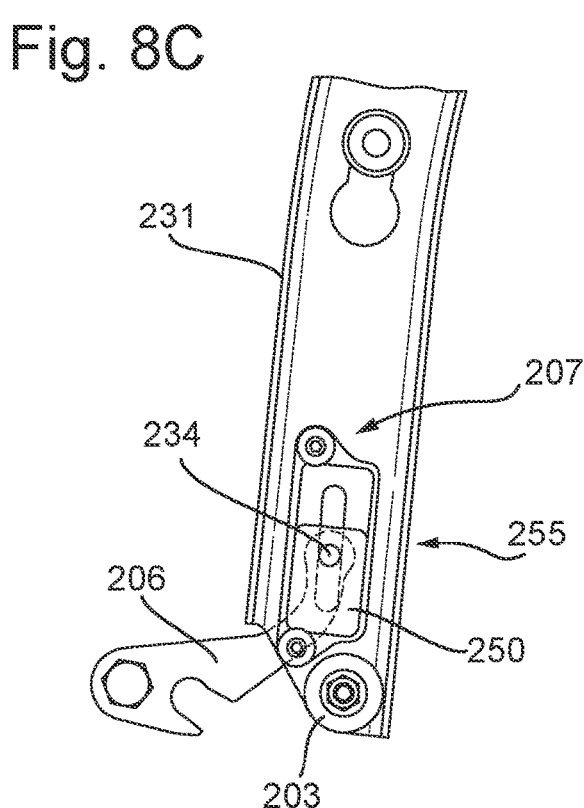

FIGS. 7A to 7C, show various stages in the action of the restoring mechanism 255. FIGS. 8A to 8C show the same stages from inside the seat back assembly 202. The restoring mechanism comprises a resilient element 250, which in the illustrated embodiment is a block of elastomeric material but may, for example, comprise a spring. The block of elastomeric material 250 may act between the moveable linkage pin 234 and the stationary bolt 245 or another stationary abutment which may be formed on or fixed to the wall 231 of the seat back assembly 202. Thus, when a load over a predetermined load is applied to the seat back assembly 202, the link 206 is released from the friction assembly 203 and the linkage pin 234 begins to move downwardly, guided by the slot 220. As the linkage pin 234 moves closer to the stationary bolt 245, the elastomeric block 250 is compressed. When the force applied to the seat back assembly 202 subsides, the elastomeric material 250 recovers and moves to assume its original shape, thereby pushing the linkage pin 234 away from the bolt 245 and causing the link 206 and seat back assembly 202 to move back at least partially to their normal operating positions.

If the force applied to the seat back assembly 202 is from an HIC incident, the at least partial return of the seat back assembly 202 to its normal operating position when the HIC incident ends is helpful in that it increases the space available for the passenger to get out of the seat and evacuate the plane. Similarly, if the force applied to the seat back assembly 202 is an abuse load, the at least partial return of the seat back assembly 202 to its normal operating position, is helpful to cabin crew or ground crew in resetting the friction assembly and getting the seat back into use.

Figure 9A:
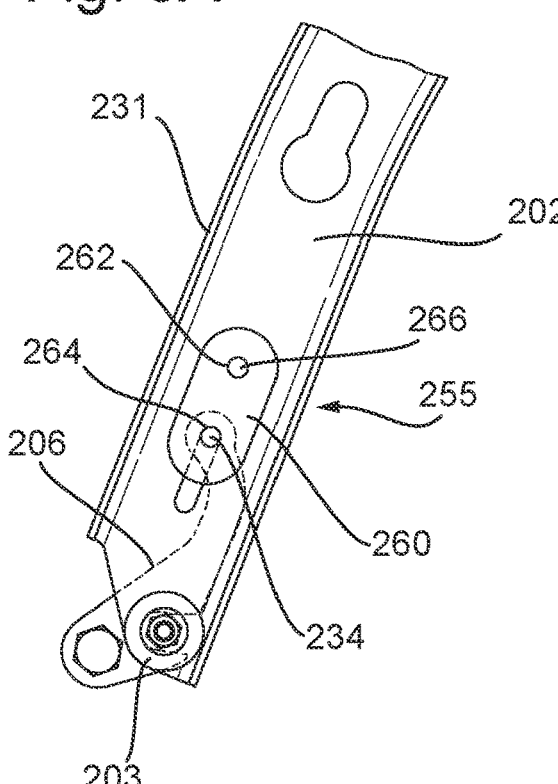
FIGS. 9A to 9C illustrate another return mechanism for the seat back assembly using a resilient element in tension.
Figure 9B:
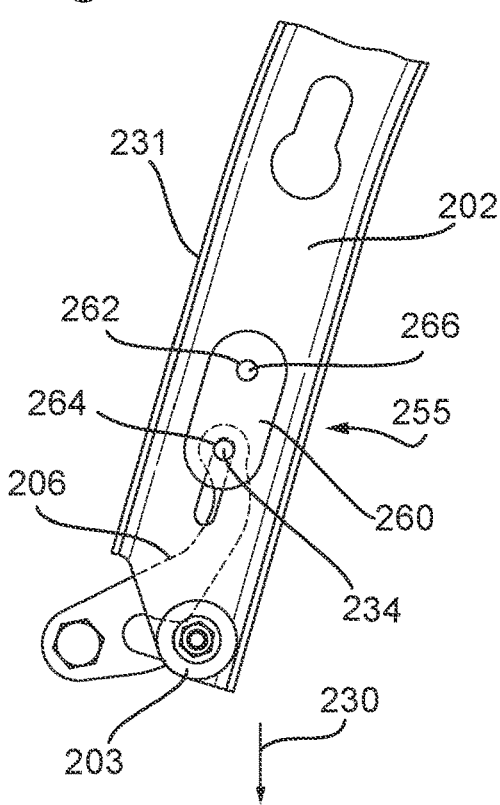
Figure 9C:
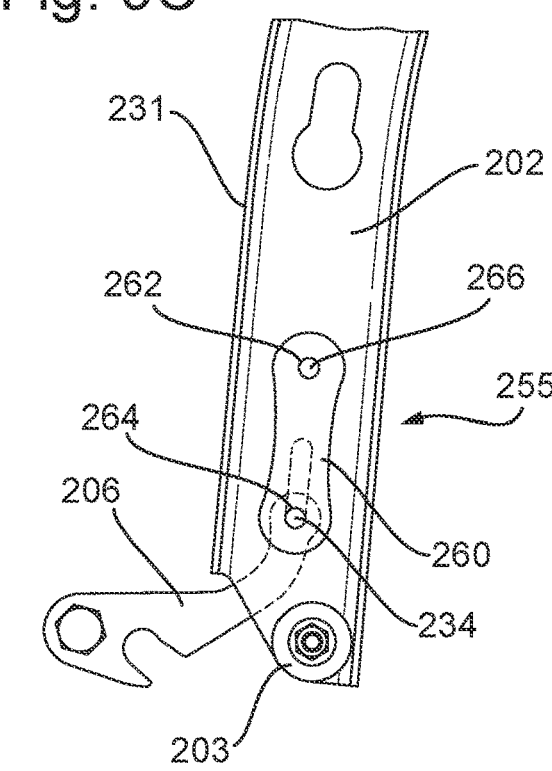
Figures 10A, 10B, 10C:
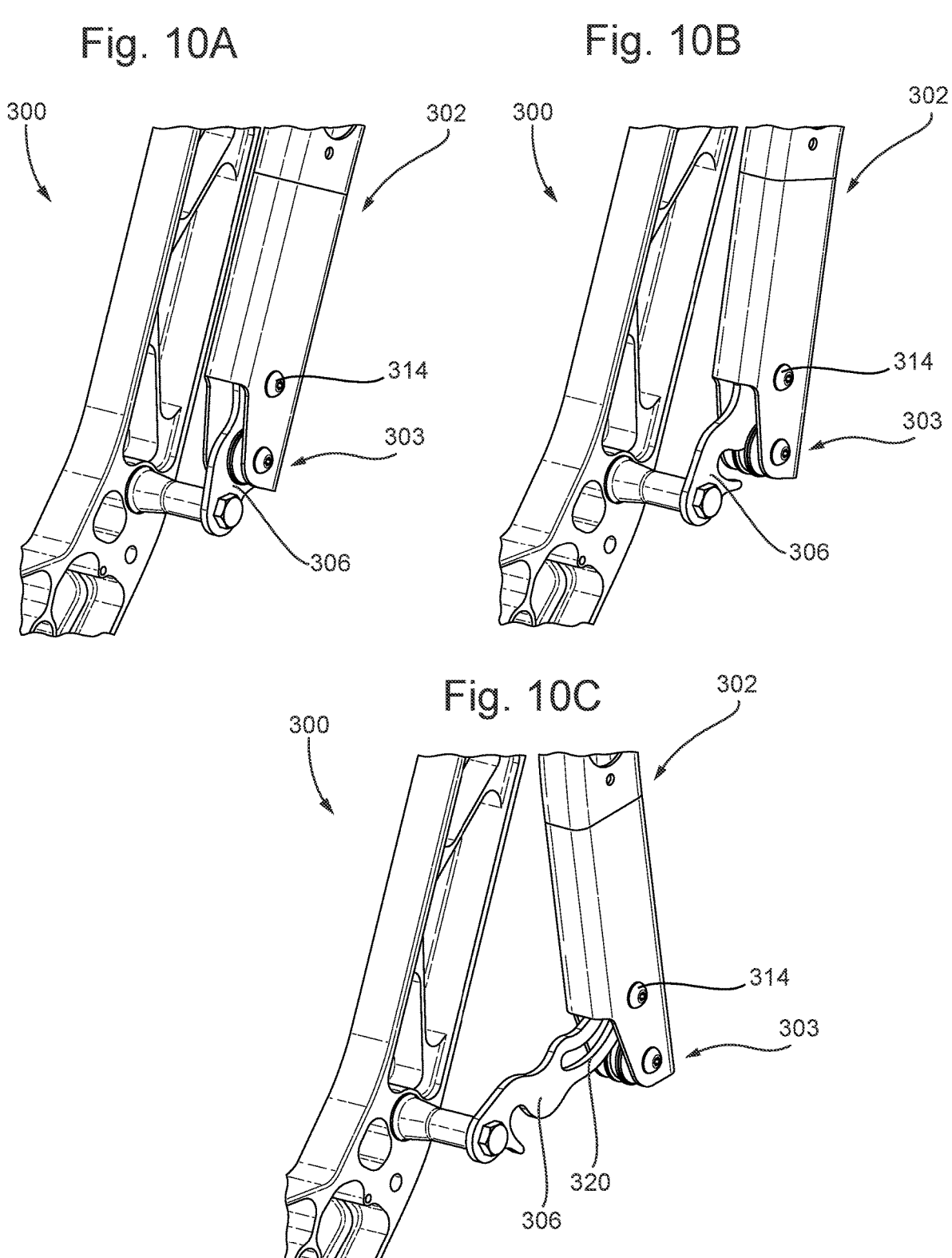
FIGS. 10A to 10C are perspective views of a second arrangement of seat release mechanism in various stages of engagement.
Figure 11A:
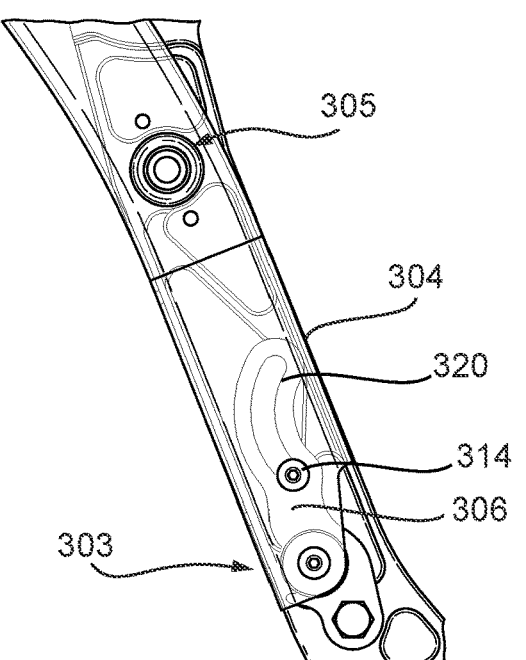
Figure 11B:
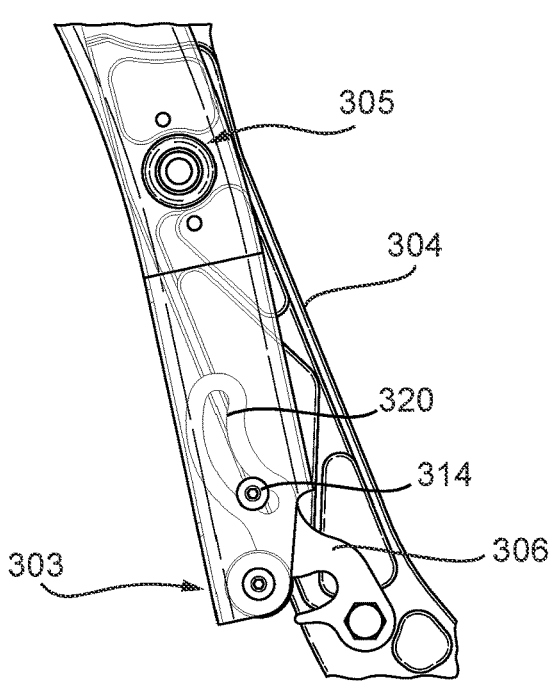
Figure 11C:
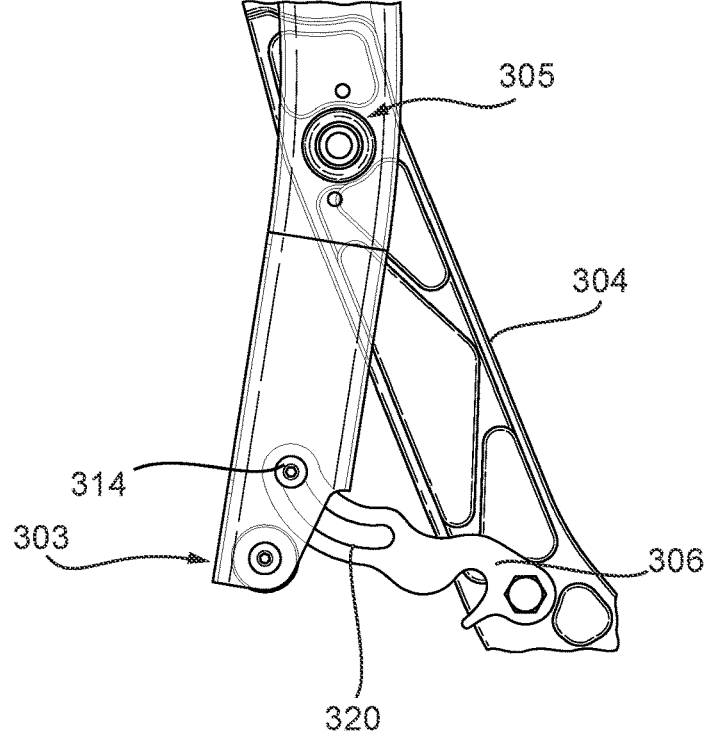

FIGS. 9A to 9C show an alternative restoring mechanism comprising an elastomeric block 260 which is loaded in tension. In this embodiment bores 262, 264 are formed in the ends of the elastomeric block 260. The free end of the linkage pin 234 is inserted into the lower bore 262 and a cantilever pin 266 which is fixed to the wall 231 of the seat back assembly 202 is inserted into the upper bore 264. Thus, when a load over a predetermined load is applied to the seat back assembly 202, the link 206 is released from the friction assembly 203 and the linkage pin 234 begins to move downwardly, guided by the slot 220. As the linkage pin 234 moves further away from the cantilever pin 266, the elastomeric block is stretched, thereby generating a restoring force in the elastomeric block which is applied to the linkage pin 234. When the force applied to the seat back assembly subsides, the elastomeric element contracts back towards its original shape, thereby pulling the linkage pin 234 towards the cantilever pin 266 and causing the link 206 and seat back assembly 202 to move back at least partially to their normal operating position.

The friction assembly 203 described herein is configured to be easily reset. Thus, in the event of activation due to abuse, it is possible to reset the friction assembly without replacing components. Furthermore, the resistance to movement provided by the restoring mechanism 255 ensures that the seat back assembly is compliant with the industry standard requirement that the seat back is "not easily pushed forward".

The examples set out herein describe the components of the seat assembly in relation to one side of the seat. For example, as is shown in FIG. 2A, the components described above are arranged on a right hand side of the seat assembly. The opposing side of the seat assembly (e.g. the left hand side) may comprise the same components as described in relation to the right hand side, arranged in a mirror fashion. Thus, one seat assembly 200 as shown in FIG. 2A may comprise two upper seat back fixings 205 and two lower seat back fixings 207.

Where components are described in relation to a "side" of the seat assembly 200 or seat back assembly 202 herein, a side refers to a face which extends substantially perpendicular to a face of a seat assembly which will be in contact with an occupant during use. Where used herein, an "upper portion" of a seat back assembly is a region in an upper half of a seat back assembly or a region above a predetermined point, such as a pivot point. Furthermore, the examples herein are described in relation to a seat assembly 200 which is in use with the seat back assembly 202 in an upright, or substantially vertical orientation. The "front" of the seat is a face which is in contact with an occupant during use, and a forwards direction is a direction which an occupant will be facing when sitting in the seat. The "back" of the seat is a face of the seat opposite to the front face of the seat. As described herein, the predetermined force may be applied to a back of the seat with a component in a forward direction.

Figures 12, 13:
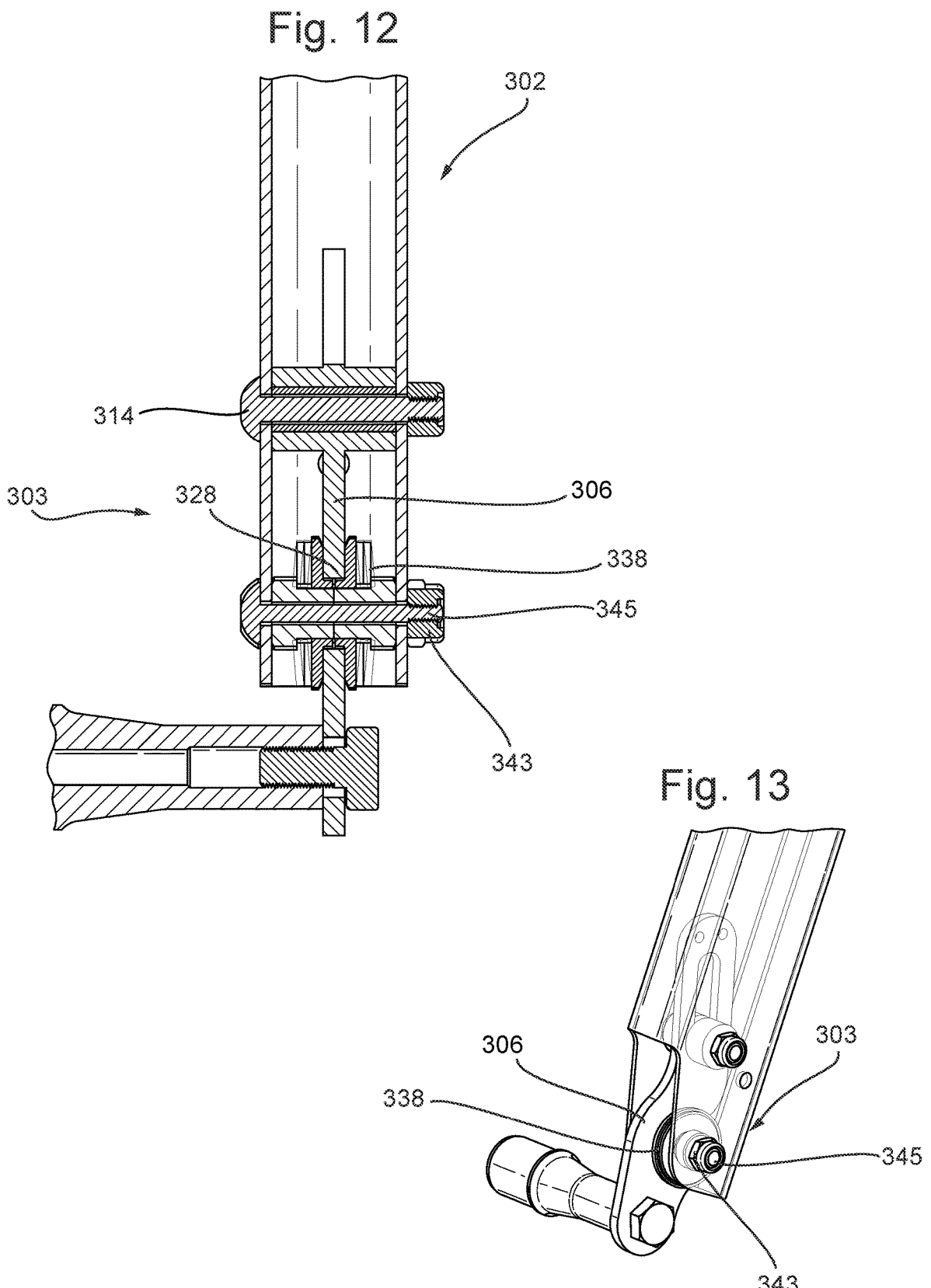
FIG. 12 is a cross section through a second arrangement of friction assembly.
FIG. 13 is a cutaway view of the second arrangement of friction assembly.

In an alternative arrangement illustrated in FIGS. 10A to 13, the slot 320 is formed in the link 306 and the linkage pin 314 is fixed to the seat back assembly 302. Also, as illustrated in FIG. 12, the friction assembly 303 comprises one or more Belleville springs 338 provided on each side of the link 306, and hence the friction assembly 303 applies an even clamping force to both sides of the link 306 when the nut 343 is tightened onto the bolt 345.

This arrangement works in exactly the same way as the previous arrangement of FIGS. 1 to 10C, with the friction assembly 303 fixed to the seat back assembly and received in a cut out 328 in the link 306 so that it clamps the link 306 under the action of the Belleville springs 338 and prevents the link 306 from moving in normal use of the seat. In an overload condition, such as might occur in a crash, the frictional force of the friction assembly 303 is overcome, thereby releasing the link 306 and enabling the seat back assembly 302 to rotate about the upper seat back fixings 305 and the upper portion of the seat back assembly 302 (e.g. above the upper seat back fixings 305) is able to tilt forwards increasing the time over which the impact is absorbed through the seat assembly 300 and thereby reducing the deceleration and likely severity of injury. As mentioned in relation to the previous arrangement, the link 306 is rotatably mounted at one end to the support frame 304 and at the other end to the seat back assembly 302, so even after it has been released from the friction assembly 303, it serves to limit the movement of the seat back assembly 302 relative to the support frame 304, so that the seat back assembly 302 is not over tilted and thereby is prevented from causing an injury to the passenger sitting on that seat.

It will be appreciated by those skilled in the art that although the invention has been described by way of example, with reference to one or more examples, it is not limited to the disclosed examples and that alternative examples could be constructed without departing from the scope of the invention as defined by the appended claims.

The invention claimed is:

1. A seat assembly comprising a support frame, a seat back assembly, an upper seat back fixing and a lower seat back fixing, the upper seat back fixing and the lower seat back fixing configured to connect the seat back assembly to the support frame, wherein:

the upper seat back fixing comprises a rotatable connection between the seat back assembly and the support frame; and the lower seat back fixing comprises:

a friction assembly attached to the seat back assembly or the support frame configured to hold the seat back assembly in position relative to the support frame in normal use and configured to allow the seat back assembly above the upper seat back fixing to move forwards relative to the support frame in response to greater than a predetermined force being applied to the seat back assembly; and a link attached at one end to the seat back assembly and at the other end to the support frame, wherein the friction assembly applies a clamping force to the link which is set so that the link will slide out of the friction assembly when a force greater than a predetermined force is applied to the seat back assembly.

2. The seat assembly as claimed in claim 1, wherein the link limits movement of the seat back assembly relative to the support frame.

3. The seat assembly as claimed in claim 2, wherein the friction assembly acts on the link to prevent it moving in normal use.

4. The seat assembly as claimed in claim 1, wherein the friction assembly comprises at least one Belleville washer.

5. The seat assembly as claimed in claim 4, wherein the at least one Belleville washer is mounted on a collar comprising a tubular portion which supports the at least one Belleville washer and a flange which applies the clamping force to the link.

6. The seat assembly as claimed in claim 2, wherein the link is attached to the seat back assembly or the frame by means of a sliding connection which allows the link to translate as well as rotate.

7. The seat assembly as claimed in claim 6, wherein the link is configured to translate substantially in a downward direction at the sliding connection.

8. The seat assembly as claimed in claim 6, wherein the sliding connection comprises a slot in the seat back assembly and a linkage pin connected to the link, wherein the linkage pin is configured to be movable in the slot.

9. The seat assembly as claimed in claim 6, wherein the sliding connection comprises a slot in the link and a linkage pin connected to the seat back assembly, wherein the linkage pin is configured to be movable in the slot.

10. The seat assembly as claimed in claim 9, wherein the pin is captive in the slot.

11. The seat assembly as claimed in claim 2, wherein the link is connected to the support frame by a rotatable connection which allows the link to rotate relative to the support frame.

12. The seat assembly as claimed in claim 1, further comprising a restoring mechanism configured to oppose the movement of the seat back assembly relative to the support frame.

13. The seat assembly as claimed in claim 12, wherein the restoring mechanism is mounted in the lower seat back fixing.

14. The seat assembly as claimed in claim 12, wherein the restoring mechanism comprises a resilient element.

15. The seat assembly as claimed in claim 14, wherein the resilient element comprises an elastomeric element or a spring.

16. The seat assembly as claimed in claim 1, wherein the link is aligned with a longitudinal axis of the support frame in normal use.

17. A seat comprising the seat assembly as claimed in claim 1.

18. An aircraft having a plurality of seat assemblies as claimed in claim 1.

* * * * *